United States Patent [19]

Burga

[11] Patent Number: 4,720,414

[45] Date of Patent: Jan. 19, 1988

[54] FIRE-RESISTANT MATERIAL

[76] Inventor: Roque F. Burga, 12542 Eckleson St., Cerritos, Calif. 90701

[21] Appl. No.: 878,429

[22] Filed: Jun. 25, 1986

[51] Int. Cl.$^4$ ............................. D06N 7/04; B32B 9/00
[52] U.S. Cl. ..................................... 428/141; 428/688; 428/920; 428/921
[58] Field of Search ............... 428/688, 920, 921, 211, 428/141, 144, 145

[56] References Cited

U.S. PATENT DOCUMENTS

| | | | |
|---|---|---|---|
| 2,381,487 | 8/1945 | Cook et al. | 106/15 |
| 3,975,142 | 8/1976 | Banks | 432/3 |
| 4,041,000 | 8/1977 | Farcnik | 260/29.6 B |

FOREIGN PATENT DOCUMENTS

| | | | |
|---|---|---|---|
| 1583618 | 8/1971 | Fed. Rep. of Germany | 428/920 |
| 2496144 | 6/1982 | France | 428/920 |
| 0121661 | 9/1981 | Japan | 428/920 |
| 0185143 | 11/1982 | Japan | 428/920 |

OTHER PUBLICATIONS

Fireproof Coating Composition, CA93(10): 100524; 1980; Werllner Werke.

*Primary Examiner*—John E. Kittle
*Assistant Examiner*—Patrick J. Ryan
*Attorney, Agent, or Firm*—Blakely, Sokoloff, Taylor, Zafman

[57] ABSTRACT

A fire resistant material comprising a rigid sheet impregnated with a binder composition comprising alkali metal silicate, and sugar in an aqueous solution having a specified density, and coated with a composition comprising brick dust, silica and saw dust all having predetermined particle sizes, in combination with the binder composition. The impregnated sheets are allowed to harden and may be used as fire retardant building materials in the construction of various structures.

12 Claims, No Drawings

FIRE-RESISTANT MATERIAL

FIELD OF THE INVENTION

This invention is directed to materials coated with a composition providing fire-resistant properties, and more particularly to products, such as corrugated cardboard, wood and fabrics coated with said composition, for use in buildings and other structures.

BACKGROUND OF THE INVENTION

In view of the fact that conventional home construction comprises in large part flammable material such as wood studs, rafters and other framing, as well lathe work, wood flooring and subflooring and the like, the danger of fire in homes is substantial. Fires can arise from many different sources in the home including faulty wiring, cooking hazards, and exogenous heat and flame, such as from forest and brush fires.

Even small commercial buildings are fabricated largely with flammable materials and are subject to the same hazards. Moreover, most conventional paints and other similar floor, wall and ceiling coating materials and coverings are highly flammable and thus add to the risk of fire, and its proliferaton. In recent years, efforts have been made to reduce building hazards by many means, including more strict electrical codes, fire proof roofing materials, etc. In some instances, flame proofing agents have been applied to walls, ceilings, etc., in the form of liquid coating compositions. For example, the material disclosed in Farcink (U.S. Pat. No. 4,041,000) is such a material.

Blancquart (U.S. Pat. No. 3,687,700) discloses a thermally insulating coating material comprising interalia, of silica, wood floor, floccuable clay (such as bentonite), and sodium silicate for use as a heat insulating coating material for metal molds.

Firth et al (U.S. Pat. No. 1,819,364) discloses an insulating hot top made from saw dust, clay and sodium silicate.

Chollet (U.S. Pat. No. 4,466,463) discloses a flame-resistant adhesive made from alkali metal silicate (sodium or potassium), kaoline clay, asbestos, and an organic compound such as carboxymethylcellulose.

None of the foregoing material are standardly used in the building industry for various reasons. Furthermore, none of the making sheets of material have been used or suggested for use for sending materials sufficiently rigid so that they can be used as a wall, ceiling, flooring or the like.

Many buildings and structures are formed having walls comprising plaster board. Plasterboard contains a cardboard-like material with a plaster material sandwiched therebetween. This plaster board material, while being relatively structurally sound, is somewhat flammable, and when it burns, it produces flame and gases which are disbursed into the atmosphere. The deaths and injuries which occur as a result of fires are often caused by smoke, rather than by the actual burning of the victims, the smoke causing the victims to asphyxiate. The foregoing problems with prior art building materials are overcome by the present invention which is described below.

SUMMARY OF THE INVENTION

The present invention comprises a corrugated cardboard, or other rigid material, being partially impregnated and partially coated with the compositions described hereinbelow. The invented material is fire-resistant, in that it is capable of resisting burning or the spread of flames as a result of direct, or indirect heating or flame.

The first invented composition is a binder or adhesive solution comprising alkali metal silicates, such as sodium or potassium silicate having a density of 40° to 41° Be' (Baume) and a water-sugar solution having a density of 10° to 15° Be'. The second composition is a fire-resistant material comprising brick dust, mesh 200, or other non-metallic powder; silica, mesh 325; saw dust formed in fine particles; and the above-noted binder. This combination forms a pasty product which can be used to coat and impregnate various materials to provide a hardened surface and fire retardant material.

In making the hardened material, corrugated cardboard, or other material, is completely submersed or coated with the above-described first composition for one minute or less. The coated and impregnated cardboard in then removed from the composition. Multi-layers of cardboard may at this point be pressed together to form a laminate of desired thickness. The single-layer or multi-layer material is then drained to remove excess liquid and pressed to further remove liquid at a pressure which does not deform the corrugation. The outsides of the corrugated material are then blotted dry.

The second composition which is in the form of a paste is then applied to the sheets of material which are then allowed to dry. Preferably the sheets have a coating of the pasty product of approximately 1.5 to 2 millimeters. The drying process takes place at room temperature in 1 to 3 days, or it may be dried in the drying chamber in much shorter time (e.g. 2 to 5 hours).

In addition to the foregoing, in place of the corrugated cardboard, wood, flat cardboard, metal, concrete, glass, ceramic, wool and plant derived knit fabrics may be treated as described above. The adhesive adheres loosely to plastic materials. The material may also be dyed, painted or used as a natural colored coating as a wall or other surface which may displayed.

In tests of the material, minimal carbonization of the material is produced after heating, even at extreme temperatures using a propane torch. In addition, no flames are formed on the heated surface and no spark or ash is given off. Furthermore, heat transfer to the unheated side of the invented material is minimized thereby showing that the invented material also provides good thermal insulation. The material is also a relatively good electrical insulator, as well. Further, gases produced as a result of any burning which may occur from the impregnated corrugated cardboard travels through the corrugations and are thereby transferred outside a structure comprised of the invented material rather than into the atmosphere inside the structure thereby risking the result of asphyxiating an individual trapped in a building comprising the invented material.

It is an object of the present invention to provide a material which is capable of resisting the propogation of fire, thereby safeguarding life and preserving property.

It is another object of this invention to provide a product which may act as a substitute for wood and other building materials.

DETAILED DESCRIPTION OF THE INVENTION

The present invention comprises a rigid material for buildings, structures, and devices impregnated with a composition which renders the material greatly fire-resistant. The invented material can be used in a variety of environments as described in further detail below.

The composition used for impregnating the invented materials is comprised of a binder or adhesive consisting of alkali metal silicates, such as potassium and sodium silicate, in solution, having specific density, and a water-sugar solution having a specific density.

More particularly, the preferred embodiment of the present invention is described with respect to its preparation as discussed below. The binder solution acts as an adhesive which allows the fire-resistant composition to adhere to various types of surfaces including wood, metal, paper and fabric material made of natural fibers. In addition, the binder also allows the various materials to be coated to adhere together thereby forming laminates to provide substantial thickness and rigidity.

The binder material comprises in the preferred embodiment, alkali metal silicate having a density of 40° to 41° Be', and water-sugar solution having a density of 10° to 13° Be'. The alkali metal silicates are either potassium silicate, sodium silicate, or mixtures thereof. In the preferred composition, the density of the water-sugar solution is 13° Be' which is formed by adding 350 grams of sugar to 1.0 liter of water.

The potassium silicate described above has preferably a weight ratio of $SiO_2/K_2O$ of 2.10, and the sodium silicate described above has weight ratio of $SiO_2/Na_2O$ ranging from 3.22 from 3.30. In addition the ratio of potassium silicate to sodium silicate can vary from 3:0 to 0:3. The final composition of the binder solution can have a density of 32° to 35° Be' and should be rigorously controlled within that range. For densities from 32° to 33.5° Be' the combination of silicate to water-sugar solution should be 2 volumes of alkali metal silicate having a density of 40° to 41° Be' with one volume of water-sugar solution having a density of 10° to 15° Be'. The silicates may be employed alone, or by a mixture of both, e.g. 2 volumes of sodium silicate, 2 volumes of potassium silicate, or one volume of each.

If a harder and more refractory material is desired a density of 33.5° to 35.0° Be' of the binder should be employed which can be obtained by mixing 3 volumes of alkali metal silicate solution having density of 40° to 41° Be' with one volume of water-sugar solution having a density 10° to 15° Be'. As described above, the volume concentration of the silicates can range from 3 parts sodium silicate: 0 parts potassium silicate to 0 parts sodium silicate: 3 parts potassium silicate, or anywhere in between.

The coating composition is formed by combining together and homogenizing brick dust, silica and saw dust of predetermined mesh size with the above-described binder. This material is homogenized and macerated until a paste is formed. After maceration all floating liquid is removed so that only the pasty product formed by the above combination is utilized.

More particularly, the composition for coating the material is made by combining approximately 2½ volumes of binder, as described above, with the following components: 1 volume of brick dust having a mesh size of approximately 200; 1 volume of silica having a mesh size of 325; and 2 volumes of saw dust, homogenized into fine particles. As an alternative to brick dust, any of a number of non-metallic powders such as kaolin, talc, pyrophyllite, mica, calcium carbonate, calcium sulfate and volcanic rock powder, all of which having a mesh size of approximately 200, may be used.

The homogenized combination of the components as described above is macerated for 20 to 24 hours forming a paste. Prior to application of the composition to the material to be coated, all of the floating liquid in the composition is removed so that only a pasty product remains. The separated liquid portion may be later useful for preparations of additional material, or can be incorporated into leftover pasty product to prevent it from drying out.

Treatment of Materials

As described above, a number of different materials can be impregnated with the composition to form rigid flame and fire resistant material. In the preferred embodiment, corrugated cardboard is used. However, as one of ordinary skill in the art will recognize, other materials may be used in similar fashion and may be impregnated accordingly with the invented composition.

In the first step, corrugated cardboard is dipped into the binder composition for 35 to 45 seconds, or any reasonable period of time necessary for complete impregnation of the material with the composition. The sheets of impregnated, corrugated cardboard are then removed from the composition. If thicknesses in excess of the single layer of corrugated cardboards are desired, the impregnated corrugated cardboard may be pressed together and thereby bound by the composition which is fully capable of binding the material together. This binding can be repeated using impregnated pieces of corrugated cardboard until the desired thickness is obtained.

Thereafter, the individual sheets or the layers of corrugated cardboard are then drained to remove any excess liquid therefrom. These sheets or laminates of sheets are then pressed together with pressure applied across the entire surface of the sheet to enhance the binding of the sheets together. Caution should be taken in this procedure to avoid deforming the internal groves of the cardboard sheets. To avoid having the pressed device adhering to the sheets, a thin plastic fabric of sufficient size can be used to cover the pressing device thereby preventing unwanted adherence of the pressing device to the invented sheets.

In the next step, the material is coated with the coating composition. The edges of the corrugated cardboard, or laminate thereof, are also coated with coating composition so that all but one of the edges of the material is covered with cloth or paper dampened in the binder.

The material is then dried. Drying can take place at room temperature, which takes 2 to 3 days, or in a drying chamber, in which case the drying process can be shortened to approximately 2 hours, depending upon the thickness of the material and temperature of the chamber. In the preferred embodiment, the sheets, when dried, are coated with the composition to a thickness of approximately from 1.5 to 2.0 millimeters.

Corrugated cardboard is the preferred material for the present invention. The channels formed in the cardboard provide insulation and break up the continuity of the heatable volume of the treated material which may form the walls, ceilings and/or floors in a building. Other materials described herein may be effective to a greater or lesser extent in limiting the propogation of fire.

The present invention has thus been shown to have a number of advantages over prior art systems. First, there is the control against the spread of fire on walls, wall coverings, floors and ceilings which may be made of the invented material described herein. Upon ignition of fire, gases formed as a result of burning the corrugated cardboard embodiment of the present invention travel through the channels of the corrugated cardboard and are thereby prevented from asphyxiating victims. The channels may be aligned through an entire building so that the gas escapes upward and out of the building without filling any of the rooms. In addition, the walls are substantially hard relative to the rigidity of standard corrugated cardboard and are therefore effective in providing a new, relatively inexpensive, and very safe building material.

The material provides effective heat insulation, shown by the above described experiments and therefore would result in lower construction costs and lower costs of upkeep as a result of heat loss in the building. Furthermore, the invented material is lighter weight than traditionally used materials due to the amount of enclosed air inside the corrugated cardboard fabricated material. In addition, as a result of the enclosed air, the invented material provides reasonable acoustic insulation. Further, other tests have shown that the material acts as a reasonable electrical insulator and can insulate up to 5000 volts.

The material is very strong and extraordinarily hard relative to prior art plasterboard and related building materials. The material also repels termite attack and other potential insect attacks and deterioration. The material can be nailed for easy assembly and can be sawed into various shapes and sizes as desired. The coating provides great durability for interior and exterior thereby providing extended life. Moreover, the material does not promote fungal growth, in part as a result of its high salt content.

When wet in its pasty form, the material adheres very lightly to plastic fabrics and other similar materials, thereby enabling it to be easily manipulated and handled with minimal adhesion to undesired parts.

In addition to the use of the invented composition on cardboard, it is comtemplated that it may be used on a number of other products and materials including wood, cardboard sheets, metals, concrete, glass, ceramics, and wool and plant knit fabrics. For example, sheets of wood or cardboard can be made into doors thereby providing an effective barrier between various rooms in a building and would restrict or contain the burning of any material inside a building to the materials inside the particular room which is caught on fire. This would provide a great benefit in eliminating the spread of fire throughout a large building.

EXPERIMENTS

A number of experiments were conducted to determine the effectiveness of the invented material as an insulator and fire retardant.

Experiment 1—Insulation Capacity

The bottom and sides of a metal can are coated with cardboard sheets impregnated with a composition described herein. A propane gas blow torch generating between 1200 to 1300° Fahrenheit is used to heat the bottom of the can for 5 minutes. A small portion of the center of the can becomes incandescent for a short period of time and then carbonizes with no apparent additional burning. After 5 minutes of heating with the torch, there is no significant rise in temperature on the inside of the can and one can place ones fist inside the can against the bottom to determine the rise in temperature. The bottom of the can is only slightly warm to touch.

Experiment 2—Fire Retardant

A portion of a strip of corrugated carboard is impregnated with the binder composition in accordance with the above-described procedure. The composition is dried as described and subject to the following test.

The cardboard is placed in the propane torch flame and immediately begins to burn, char and burst into flames. However, the treated portion when placed in direct flame of the propane torch carbonizes but does not propogate the fire. Furthermore, to the extent that the fire which begins in the untreated portion reaches the treated portion, the fire ceases its advancement and burns itself out.

Experiment 3

A cardboard tube having a inside diameter of 1 inch and a length of 8 1/4 inches is treated with the composition described herein. The cardboard tube is attached bound to a base which is also coated with the composition. With the cardboard tube standing upright, gasoline is poured into the tube up to approximately 8 inches in height and the gasoline is ignited. The gasoline burns activity for approximately 1 hour. The flame then begins to decrease. Thereafter, no matter what is done to revive the flame, it only flares up for less than 3 seconds and then dies out.

The foregoing invention having been described, it will be appreciated by one of ordinary skill in the art that many modifications, alterations and adaptations can be made to the present invention in accordance with the disclosure herein. It is believed that all such modifications, alterations and adaptations come within the scope of the present invention which is determined by the claims amended hereto rather than the preferred embodiment described above.

I claim:

1. A fire resistant material comprising a rigid sheet impregnated with a binder composition comprising, by volume:
   two to three parts alkali metal silicate solution having a density in the range of 40° to 41° Be'; and
   one part sugar in aqueous solution, said sugar solution having a density of approximately 10° to 15° Be';
   said impregnated rigid sheet being coated with a coating composition comprising:
   one volume non-metallic powder selected from the group consisting of brick dust, kaolin, talc, pyrophyllite, mica, calcium carbonate, calcium sulfate, and volcanic rock powder;
   one volume silica;
   two volumes of fine mesh saw dust; and
   two and one half volumes of said binder composition.

2. The fire resistant material of claim 1 wherein said alkali metal silicate is selected from potassium silicate and sodium silicate.

3. The fire resistant material claim 2, wherein said alkali metal silicate comprises equal portions potassium silicate and sodium silicate.

4. The fire resistant material of claim 2, wherein said alkali metal silicate comprises in the range of 2 parts potassium silicate to 1 part sodium silicate to 2 parts potassium silicate to 1 part sodium silicate.

5. The fire retardant material of claim 1, wherein said sugar solution has a density of approximately 13° Be'.

6. The fire retardant material of claim 1, wherein said non-metallic powder comprises brick dust.

7. The fire retardant material of claim 1, wherein said rigid material comprises sheets selected from corrugated cardboard, cardboard sheets, wood, metal, concrete, glass, ceramic, and wool and plant knit fabrics.

8. The fire retardant material of claim 1, wherein said rigid material is corrugated cardboard.

9. A method of producing a fire retardant material comprising the steps of:
   a. making a binder composition comprising:
      two to three parts alkali metal silicate having a density in the range of 40° to 41° Be'; and
      one part aqueous sugar solution having a density of 10° to 15° Be';
   b. making a paste solution comprising:
      one volume of non-metallic powder, said non-metallic powder being selected from the group consisting of brick dust, kaolin, talc, pyrophyllite, mica, calcium carbonate, calcium sulfate, and volcanic rock powder;
      one volume of silica;
      two volumes of fine particle saw dust; and
      two and half volumes of said binder composition from step a;
   c. impregnating a rigid material with the composition of step a;
   d. draining said impregnated rigid material;
   e. coating said impregnated rigid material with the composition of step b; and
   f. drying said coated rigid material.

10. The method of claim 9, wherein said rigid material comprises corrugated cardboard.

11. The method of claim 9, wherein said material is coated with the composition of step b to a thickness of 1.5 to 2.0 millimeters in thickness.

12. The method of claim 9 further comprising the step of, after step c and prior to step e, impregnating at least one additional sheet of rigid material with the composition of step a and binding said at least one additional sheet with the impregnated material from step c to form a laminate of rigid material.

* * * * *